United States Patent [19]

Adams

[11] Patent Number: 5,213,174
[45] Date of Patent: May 25, 1993

[54] POWER STEERING ASSEMBLY

[75] Inventor: Charles E. Adams, Knoxville, Tenn.

[73] Assignee: TRW Inc., Lyndhurst, Ohio

[21] Appl. No.: 689,009

[22] Filed: Apr. 22, 1991

[51] Int. Cl.⁵ .............................................. B62D 5/06
[52] U.S. Cl. .................................. 180/147; 180/148; 180/149
[58] Field of Search ............... 180/132, 146, 147, 148, 180/149

[56] References Cited

U.S. PATENT DOCUMENTS

| 3,709,099 | 1/1973 | Dumeah ........................... 180/147 X |
| 3,807,456 | 4/1974 | Colletti . |
| 3,967,537 | 7/1976 | Strauff . |
| 4,369,695 | 1/1983 | Nishikawa et al. . |
| 4,381,799 | 5/1983 | Sato et al. . |
| 4,494,446 | 1/1985 | Webber et al. . |
| 4,501,191 | 2/1985 | Webber et al. .................. 180/148 X |
| 4,632,204 | 12/1986 | Honaga et al. . |
| 4,676,334 | 6/1987 | Nakamura et al. . |

FOREIGN PATENT DOCUMENTS

| 0084262 | 5/1982 | Japan ................................... 180/132 |
| 2182897 | 5/1987 | United Kingdom ................ 180/148 |

Primary Examiner—H. Grant Skaggs
Assistant Examiner—Carol Lynn Drazbick
Attorney, Agent, or Firm—Tarolli, Sundheim & Covell

[57] ABSTRACT

A hydraulic power rack and pinion steering assembly includes a modular control valve assembly. The modular control valve assembly can be assembled and tested at a location remote from a separate rack housing. The modular control valve assembly comprises a tubular steel member supporting a hydraulic fluid control valve that controls a hydraulic cylinder for moving the rack.

13 Claims, 3 Drawing Sheets

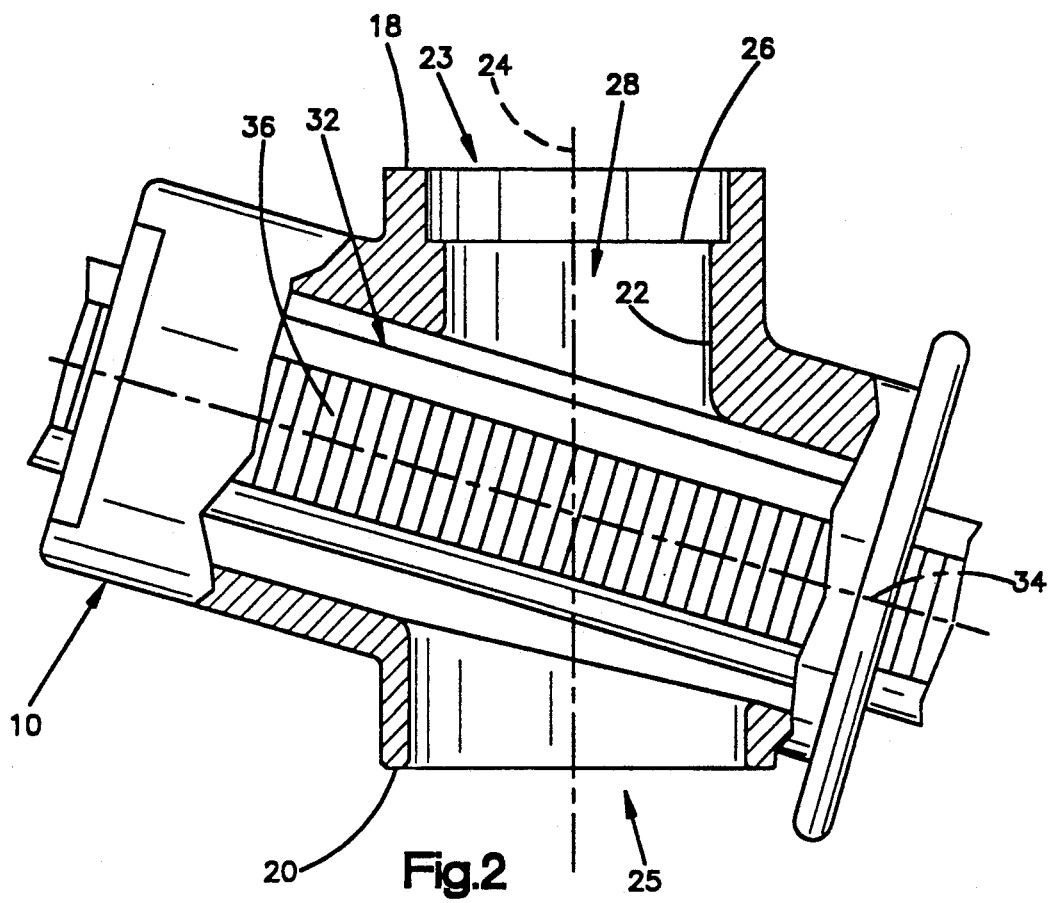
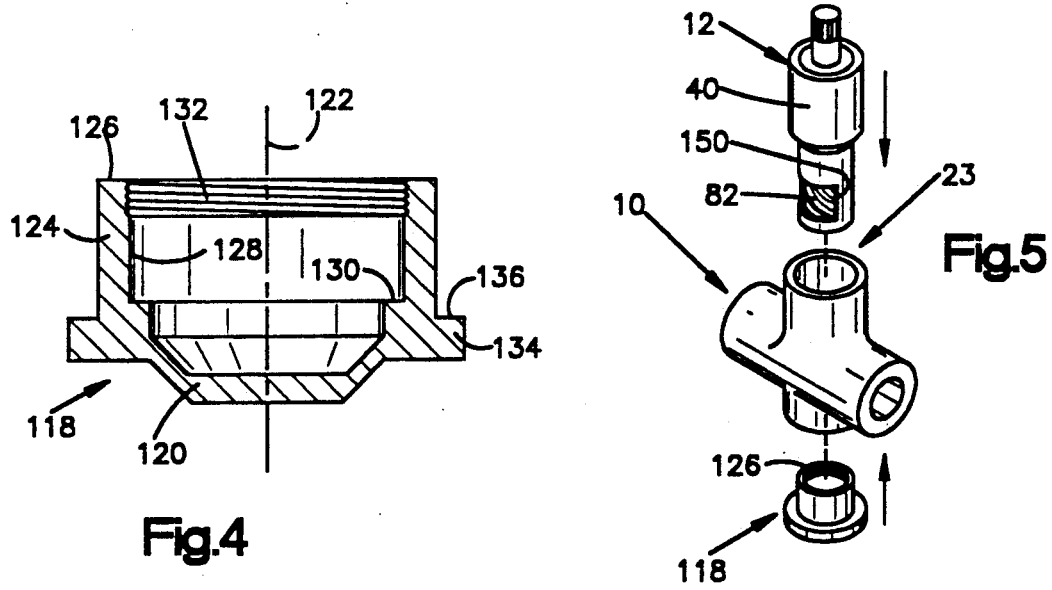

POWER STEERING ASSEMBLY

FIELD OF THE INVENTION

The present invention relates to a hydraulic power rack and pinion steering assembly for steering a vehicle.

BACKGROUND OF THE INVENTION

Hydraulic power rack and pinion steering assemblies for steering a vehicle typically have a cast metal housing. The cast metal housing supports the rack for longitudinal movement to steer the vehicle. The cast metal housing also contains a hydraulic control valve. The hydraulic control valve responds to rotation of an input shaft to regulate the flow of hydraulic fluid to a hydraulic cylinder that moves the rack. Typically, mechanical and hydraulic testing of the assembly occurs after the hydraulic control valve is assembled into the cast metal housing. Assembly problems and hydraulic leaks can occur with the cast metal material of the housing. Hydraulic leaks can also occur through seals that seal the housing. The steering assembly must be disassembled if certain leaks are found. It is expensive and nonproductive to repair the assembly if it must be disassembled due to discovery of a leak, or lack of establishing a correct hydraulic center.

A cast metal housing also has ports through which hydraulic fluid flows between the hydraulic cylinder and the hydraulic control valve. There are constraints on where those ports can be located in a steering assembly, and different steering assembly designs usually require different locations for the ports. The ports are formed in a cast metal housing at predetermined locations when the metal is cast. The cast metal housing can then be used in a steering assembly that requires the ports to be in those locations, but cannot be used in a steering assembly that requires the ports to be in different locations. The manufacturing process for a cast metal housing is thus limited to a particular steering assembly design.

SUMMARY OF THE INVENTION

In accordance with the present invention, a hydraulic power rack and pinion steering assembly for a vehicle comprises a rack housing and a modular control valve assembly including an encapsulating valve housing. The rack housing supports a rack for longitudinal movement. A hydraulic cylinder with a piston moves the rack to steer the vehicle wheels connected to the rack. The modular control valve assembly controls the flow of hydraulic fluid from a pump to the hydraulic cylinder and from the hydraulic cylinder to a reservoir. The modular control valve assembly thus controls movement of the rack to steer the vehicle wheels.

The modular control valve assembly includes an input shaft, a pinion, a torsion bar, and a hydraulic control valve. The input shaft is rotatable about its axis in response to rotation of a steering wheel in the vehicle. The pinion is rotatable about the axis of the input shaft, and has gear teeth which mesh with gear teeth on the rack. The torsion bar connects the input shaft with the pinion, and permits slight rotational displacement of the input shaft and the pinion relative to each other in response to steering torque. The hydraulic control valve comprises a cylindrical valve sleeve rigidly connected with the pinion, and a rotatable valve core which is an integral portion of the input shaft extending axially within the valve sleeve. The valve core and the valve sleeve together define flow paths for hydraulic fluid to flow through the valve.

When the input shaft rotates in one rotational direction the torsion bar is subjected to torsional deflection. When the torsion bar deflects (i) the input shaft rotates relative to the pinion through a small angle, and (ii) the valve core and valve sleeve become rotationally displaced from a neutral position. Specifically, the valve core on the input shaft rotates through a small angle relative to the valve sleeve. Relative rotational movement between the valve core and the valve sleeve adjusts the flow paths through the valve. Hydraulic fluid is then directed by the valve from the pump to one side of a piston in the hydraulic cylinder, and hydraulic fluid is exhausted from the other side of the piston and directed by the valve to the reservoir. The piston in the hydraulic cylinder then moves in one direction, and the rack is moved longitudinally with the piston in the same direction to steer the vehicle wheels. As the rack moves with the piston, the pinion is rotated by the moving rack teeth. Rotation of the pinion causes rotation of the valve sleeve in a follow-up manner, as is known. When the valve sleeve rotates into a position in which the valve core and valve sleeve are no longer rotationally displaced from their neutral positions, steering movement of the vehicle wheels stops.

The encapsulating valve housing for the modular control valve assembly is a tubular steel member having first and second ends, and having a chamber between its ends. The tubular steel member supports the hydraulic control valve in the chamber. A first seal supported by the tubular steel member blocks the flow of hydraulic fluid from the chamber past the first end of the tubular steel member, and a second seal supported by the tubular steel member blocks the flow of hydraulic fluid from the chamber past the second end of the tubular steel member. The seals thereby define and seal a fluid tight chamber for the valve.

Assembly and testing of the modular control valve assembly, including valve balancing and hydraulic leak testing, can be performed at a location remote from the rack housing, and in a configuration containing the final bearings, seals and fasteners. Since the modular control valve assembly can be tested remote from the rack housing, disassembly and reassembly of the entire rack and pinion steering assembly to replace a faulty or leaking valve is avoided. Additionally, the tubular steel member is less likely to leak than is the conventional cast metal control valve housing known in the prior art. After the modular control valve assembly is assembled and tested, it is simply and reliably attached to the rack housing and forms a permanent component of the rack and pinion steering assembly.

BRIEF DESCRIPTION OF THE DRAWINGS

Further features of the present invention will become apparent to those skilled in the art to which the present invention relates from reading the following specification with reference to the accompanying drawings, in which:

FIG. 2 is a sectional view of a part of the assembly of FIG. 1;

FIG. 4 is a sectional view of another part of the assembly of FIG. 1; and

FIG. 5 is a schematic view of parts of the assembly of FIG. 1.

DESCRIPTION OF A PREFERRED EMBODIMENT

Figure 1:
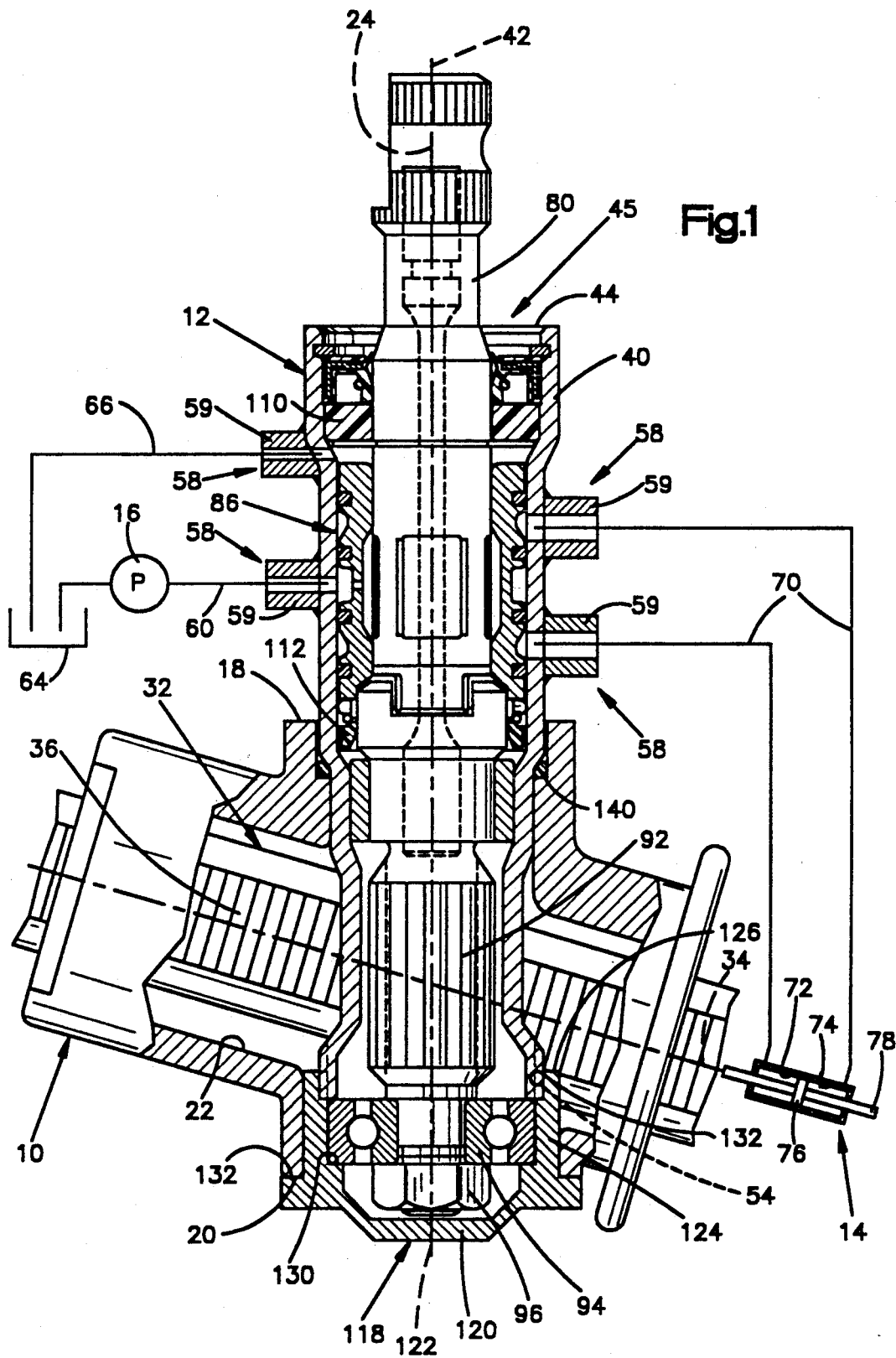
FIG. 1 is a view of a hydraulic power assisted rack and pinion steering assembly in accordance with the present invention.

As shown in FIG. 1, a hydraulic power rack and pinion steering assembly in accordance with a preferred embodiment of the present invention comprises a rack housing 10, a modular control valve assembly 12, a hydraulic cylinder 14, and a pump 16.

As shown in FIG. 2, the rack housing 10 is a cast metal member having an annular upper surface 18, an annular lower surface 20, and an irregularly shaped inner surface 22. The annular upper surface 18 surrounds a circular upper opening 23 which is centered on an axis 24. The annular lower surface 20 extends in a plane perpendicular to the axis 24, and surrounds a circular lower opening 25 which is coaxial with the upper opening 23. The inner surface 22 includes an annular shoulder portion 26 adjacent to the upper opening 23, and defines a passage 28 within the rack housing 10. The passage 28 extends between the upper and lower openings 23 and 25 along the axis 24. The rack housing is preferably formed of SAE 380 aluminum pressure die cast, or AC-2B aluminum gravity cast.

An elongate rack 32 is supported in the rack housing 10. The rack 32 has a longitudinal axis 34, rack teeth 36, and opposite end portions (not shown) which are connectable to vehicle steering linkages and associated steerable vehicle wheels in a known manner. The rack 32 is supported in the rack housing 10 for longitudinal movement to steer the steerable vehicle wheels by moving the associated steering linkages, as is known. The rack 32 is preferably formed of SAE 1040 or 1045 steel which is induction or resistance heated, quench hardened and tempered, as supplied by LTV Steel.

Figure 3:
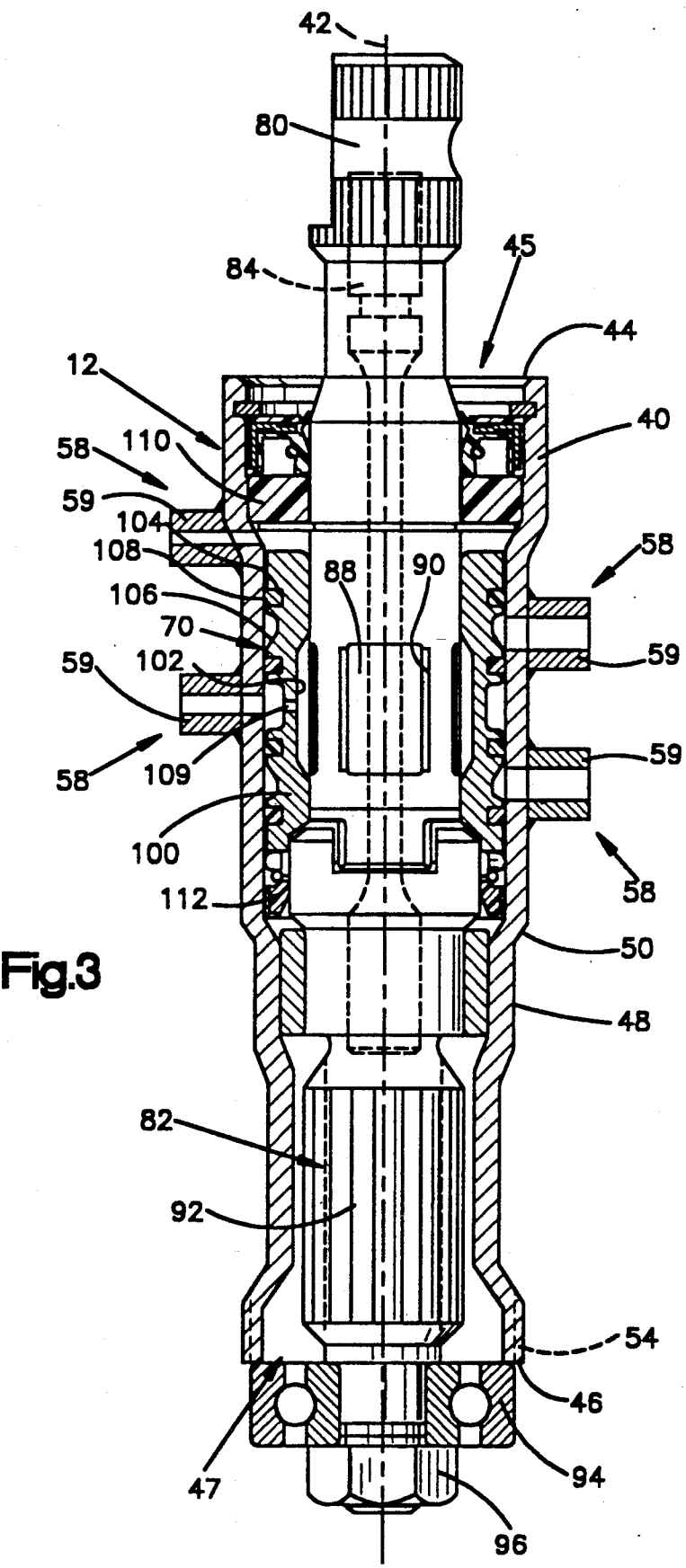
FIG. 3 is a sectional view of a modular part of the assembly of FIG. 1.

As shown in FIG. 3, the modular control valve assembly 12 comprises a cylindrical tubular steel member 40 having several cylindrical portions which are centered on a longitudinal axis 42. The tubular steel member 40 has an annular upper surface 44 surrounding a circular upper opening 45, and has an annular lower surface 46 surrounding a circular lower opening 47. The upper and lower openings 45 and 47 are centered on the longitudinal axis 42. The tubular steel member 40 also has an outer surface 48. The outer surface 48 includes an annular portion 50 at a location between the upper and lower ends of the tubular steel member 40, and has circumferential screw threads 54 extending upwardly from the annular lower surface 46. The tubular steel member 40 is preferably formed of SAE 1020 steel, mandrel drawn and intermediate annealed.

The tubular steel member 40 also has ports 58 for conducting hydraulic fluid into and out of the tubular steel member 40. The ports 58 each comprise a flare nut 59 welded to the tubular steel member 40 over an associated aperture in the tubular steel member 40. The flare nuts 59 are for connecting hydraulic lines to the tubular steel member 40. As shown schematically in FIG. 1, a hydraulic supply line 60 communicates the pump 16 and a hydraulic reservoir 64 with one port 58 in the tubular steel member 40, and a hydraulic exhaust line 66 communicates another port 58 with the reservoir 64. A pair of hydraulic lines 70 communicate each of a pair of ports 58 with respective working chambers 72 and 74 on opposite sides of a piston 76 in the hydraulic cylinder 14. A piston rod 78 is connected to the rack 32 to move the rack 32 longitudinally. The piston 78 is preferably formed of SAE 12 L 14 steel, as supplied by LTV Steel.

Referring again to FIG. 3, the modular control valve assembly 12 further comprises an input shaft 80, a pinion 82, a torsion bar 84 and a hydraulic fluid control valve 86. The input shaft 80 is connectable to a steering wheel in a vehicle, and is supported in the tubular steel member 40 for rotation about the longitudinal axis 42 in response to rotation of the vehicle steering wheel. The outer surface of the input shaft 80 has four recesses 88 which are defined in part by edges 90. The recesses 88 are centered at locations circumferentially spaced 90° about the longitudinal axis 42. The input shaft 80 is preferably formed of SAE 1040 or 1045 steel, induction hardened, as supplied by LTV Steel.

The pinion 82 has pinion teeth 92, and is supported for rotation about the longitudinal axis 42 in a bearing 94. The bearing 94 is held in place against the annular lower surface 46 of the tubular steel member 40 by a nut 96 on the end of the pinion 82. The pinion 82 is preferably formed of SAE 8115 steel, carburized, as supplied by USX.

The torsion bar 84 extends along the longitudinal axis 42, and connects the input shaft 80 with the pinion 82. The torsion bar 84 permits the input shaft 80 and the pinion 82 to rotate slightly relative to each other in response to a steering torque. The torsion bar 84 is preferably formed of SAE 1144 or SAE 5155 steel, quench hardened and tempered, as supplied by LTV Steel.

The hydraulic fluid control valve 86 comprises a valve core which includes the recesses 88 and the edges 90 on the input shaft 80. The hydraulic fluid control valve 86 also comprises a cylindrical valve sleeve 100. The valve sleeve 100 is connected with the pinion 82 to rotate with the pinion 82 relative to the input shaft 80. The valve sleeve 100 has an inner surface with recesses 102, and has an outer surface with a plurality of annular grooves 104 and recesses 106. The valve sleeve 100 is preferably formed of SAE 1040 or 1045 steel, induction hardened, as supplied by LTV steel.

A plurality of 0-ring seals 108, preferably formed of hydrogenated nitrile butyl rubber, in the grooves 104 seal the recesses 106 hydraulically from each other. Passages 109, one of which is shown in FIG. 3, communicate certain recesses 106 at the outer surface of the valve sleeve 100 with certain recesses 102 at the inner surface of the valve sleeve 100. The passages 109, the recesses 106 and 102 on the valve sleeve 100, and the recesses 88 on the input shaft 80 thus define hydraulic fluid flow paths through the hydraulic fluid control valve 86 between the ports 58.

The hydraulic fluid control valve 86 is supported in the tubular steel member 40 in a chamber defined between an upper hydraulic seal 110 and a lower hydraulic seal 112. The upper and lower hydraulic seals 110 and 112 block the flow of hydraulic fluid from the chamber axially toward the upper and lower openings 45 and 47 in the tubular steel member 40. The upper and lower hydraulic seals 110 and 112 are preferably formed of hydrogenated nitrile butyl rubber.

When the input shaft 80 and the pinion 82 rotate relative to each other in response to a steering torque applied to the input shaft 80, the valve core defined by the input shaft 80 rotates relative to the valve sleeve 100. The recesses 88 on the input shaft 80 thus rotate relative to the recesses 102 at the inner surface of the valve sleeve 100. When the recesses 88 rotate relative to the recesses 102, the hydraulic fluid flow paths through the valve 86 are adjusted so that certain hydraulic fluid flow paths become relatively restricted and certain hydraulic fluid flow paths become relatively unrestricted. A pressurized flow of hydraulic fluid is thereby directed through the hydraulic fluid control valve 86 from the pump 16 to one side of the piston 76 in the hydraulic cylinder 14, and hydraulic fluid is exhausted from the other side of the piston 76 through the hydraulic fluid control valve 86 to the reservoir 64.

When a steering torque is applied in a first rotational direction, a pressurized flow of hydraulic fluid is directed to the working chamber 72 on the left hand side of the piston 76, as shown in FIG. 1. The piston 76 and the piston rod 78 then move to the right as shown in FIG. 1. The rack 32 is then moved longitudinally with the piston rod 78 to the right as shown in FIG. 1 to effect a steering movement of the associated steerable vehicle wheels in a first direction. As the rack 32 moves with the piston rod 78, the pinion 80 is rotated by the moving rack 32 to cause follow-up rotational movement of the valve sleeve 100 relative to the valve core at the input shaft 80. When the valve sleeve 100 is thus moved to a position in which it is no longer rotationally displaced from the valve core at the input shaft 80, the hydraulic fluid flow paths through the hydraulic fluid control valve 86 are readjusted to stop longitudinal movement of the piston rod 78 and the rack 32, and to stop steering movement of the associated steerable vehicle wheels.

When a steering torque is applied to the input shaft 80 in a second rotational direction opposite to the first rotational direction, a pressurized flow of hydraulic fluid is directed to the working chamber 74 on the right hand side of the piston 76, as shown in FIG. 1. The piston 76 and the piston rod 78 then move to the left as shown in FIG. 1. The rack 32 is then moved longitudinally with the piston rod 78 to the left as shown in FIG. 1 to effect a steering movement of the associated steerable vehicle wheels in a second direction opposite to the first direction. Movement of the rack 32 to the left likewise causes follow-up rotational movement of the pinion 82 relative to the input shaft 80 to stop steering movement of the steerable wheels.

As shown in FIG. 4, a cap 118 comprises a circular end wall 120 having an axis 122, and a cylindrical wall 124 extending coaxially from the circular end wall 120. The cylindrical wall 124 has an end surface 126 defining an open end of the cap 118, and has an inner surface 128. The inner surface 128 has a shoulder portion 130, and has threads 132 extending inwardly from the open end. The cap 118 further comprises a flange 134 having an annular flange surface 136 centered on the axis 122 in a plane perpendicular to the axis 122. The cap 118 is preferably formed of SAE 1020 steel, intermediate annealed, supplied by LTV Steel.

As shown in FIG. 1, the rack housing 10, the modular control valve assembly 12 and the cap 118 have an assembled relationship wherein the modular control valve assembly 12 is fastened to the rack housing 10 by the ca 118. As shown schematically in FIG. 5, the modular control valve assembly 12 is received in the rack housing 10 coaxially through the upper opening 23 in the rack housing 10. The inner surface 22 of the rack housing 10, shown partially cut away in FIGS. 1 and 2, extends around the outer surface 48 of the tubular steel member 40 when the modular control valve assembly 12 is received in the rack housing 10.

The open end of the cap 118 is received coaxially through the lower opening 25 in the rack housing 10. A portion of the inner surface 22 of the rack housing 10 then surrounds the cylindrical wall 124 of the cap 118, and guides the cap 118 for movement into the passage 28 along the axis 24. The cap 118 is movable into the passage 28 until the annular flange surface 136 on the cap 118 moves into abutting contact with the annular lower surface 20 on the rack housing 10.

The threads 54 on the outer surface 48 of the tubular steel member 40 are engaged with the threads 132 on the inner surface 128 of the cap 118. Rotation of the cap 118 about the axis 24 relative to the tubular steel member 40 then screws the cap 118 axially onto the tubular steel member 40 to close the lower opening 47 in the tubular steel member 40. When the annular flange surface 136 on the cap 118 abuts the annular lower surface 20 on the rack housing 10, further rotation of the cap 118 about the axis 24 moves the modular control valve assembly 12 downwardly as shown in the Figures along the axis 24. When the modular control valve assembly 12 moves downwardly, the bearing 94 is moved into the cap 118 to a position abutting against the shoulder portion 130 of the inner surface 128 of the cap 118. Also, an annular hydraulic seal 140 is compressed between the annular outer surface portion 50 of the tubular steel member 40 and the shoulder portion 26 of the inner surface 22 of the rack housing 10. The modular control valve assembly 12 is thus moved into an assembled relationship with the rack housing 10 and the cap 118 as shown in FIG. 1. When the rack housing 10, the modular control valve assembly 12 and the cap 118 are in the assembled relationship shown in FIG. 1, the pinion 82 projects through an opening 150 (shown schematically in FIG. 5) in the tubular steel member 40 for the pinion teeth 92 to mesh with the rack teeth 36.

The modular control valve assembly 12 enables the hydraulic fluid control valve 86 to be properly constructed, i.e., mechanically and hydraulically centered and balanced, and tested at a location remote from the rack housing 10 The upper and lower hydraulic seals 110 and 112 are supported by the tubular steel member 40 so that a sealed hydraulic chamber for the valve 86 is defined within the modular control valve assembly 12. The sealed hydraulic chamber for the valve 86 is thus independent of the rack housing 10. Assembly and testing of the modular control valve assembly 12 can be performed without the need for handling of the rack housing 10 and the rack 32. If a leak or other problem is found, the modular control valve assembly 12 can be replaced or repaired without disassembling an entire power rack and pinion steering assembly including a rack housing, a rack and a hydraulic cylinder. Furthermore, hydraulic fluid is less likely to leak through the tubular steel member 40 than through a cast housing such as the cast valve housings known in the prior art.

The modular control valve assembly 12 also provides an advantage over known cast metal housings regarding the locations of the hydraulic ports 58. The flare nuts 59 are not manufactured integrally with the tubular steel member 40, as in cast metal assemblies, and can be located with the associated apertures at any location circumferentially about the tubular steel member 40. The manufacturing process for the modular control valve assembly 12 is therefore not limited to a specific steering assembly design.

From the above description of the invention, those skilled in the art will perceive improvements, changes and modifications. Such improvements, changes and modifications within the skill of the art are intended to be covered by the appended claims.

Having described the invention, the following is claimed:

1. A hydraulic power rack and pinion steering assembly comprising:

an elongate rack and a rotatable pinion having meshing teeth;

a hydraulic cylinder for moving said rack longitudinally;

a hydraulic fluid control valve for controlling pressurized hydraulic fluid flow to said hydraulic cylinder;

a first housing in which said rack is supported for longitudinal movement;

a second housing in which said hydraulic fluid control valve is located; and fastening means including a cap threaded on one of said first and second housings and engageable with the other of said first and second housings for moving said first and second housings together into an assembled relationship upon rotation of said cap.

2. An assembly as defined in claim 1 wherein said second housing comprises a tubular steel member containing said hydraulic fluid control valve.

3. An assembly as defined in claim 1 wherein said first housing has an opening and an inner surface defining a passage in which said rack is movable longitudinally, said second housing having a first end and a second end, said second housing being received through said opening in said first housing with said first and second ends on opposite sides of said rack, and with said inner surface of said first housing extending around said second housing, when said housings are in said assembled relationship.

4. An assembly as defined in claim 3 wherein said second housing has a longitudinal axis extending from said first end to said second end, said cap having threads for engaging threads on said second housing to move said second housing along said longitudinal axis.

5. An assembly as defined in claim 4 wherein said second housing comprises a tubular steel member containing said hydraulic fluid control valve.

6. An assembly as defined in claim 5 wherein said tubular steel member has ports for hydraulic fluid to flow into and out of said tubular steel member, said ports each comprising a hydraulic connector welded to said tubular steel member.

7. A hydraulic power rack and pinion vehicle steering assembly comprising:

an elongate rack having rack teeth;

a pinion having an axis and pinion teeth for meshing with said rack teeth;

a rack housing supporting said rack for longitudinal movement;

a hydraulic cylinder for moving said rack longitudinally;

a modular control valve assembly comprising an input shaft, a hydraulic fluid control valve, a valve housing and sealing means;

fastener means for securing said modular control valve assembly to said rack housing;

said input shaft having a longitudinal axis, being rotatable about said axis in response to rotation of a steering wheel in the vehicle, and being coaxial with said pinion;

said hydraulic fluid control valve being responsive to relative rotation of said input shaft and said pinion to control pressurized hydraulic fluid flow in said hydraulic cylinder;

said valve housing comprising a tubular steel member having a first end, a second end, and a chamber between said ends, said tubular steel member supporting said hydraulic fluid control valve in said chamber;

said sealing means hydraulically sealing said chamber to enable assembly and testing of said modular control valve assembly at a location remote from said rack housing, said sealing means including a first seal supported by said tubular steel member in a position to block the flow of hydraulic fluid from said chamber toward said first end, and a second seal supported by said tubular steel member in a position to block the flow of hydraulic fluid from said chamber toward said second end; and said rack housing further having an inner surface defining a passage in which said rack is movable longitudinally, said tubular steel member extending into said passage in said rack housing with said first and second ends on opposite sides of said rack, said inner surface of said rack housing extending around said tubular steel member.

8. A hydraulic power rack and pinion vehicle steering assembly comprising:

an elongate rack having rack teeth;

a pinion having an axis and pinion teeth for meshing with said rack teeth;

a rack housing supporting said rack for longitudinal movement;

a hydraulic cylinder for moving said rack longitudinally;

a modular control valve assembly comprising an input shaft, a hydraulic fluid control valve, a valve housing and sealing means;

fastener means for securing said modular control valve assembly to said rack housing;

said input shaft having a longitudinal axis, being rotatable about said axis in response to rotation of a steering wheel in the vehicle, and being coaxial with said pinion;

said hydraulic fluid control valve being responsive to relative rotation of said input shaft and said pinion to control pressurized hydraulic fluid flow in said hydraulic cylinder;

said valve housing comprising a tubular steel member having a first end, a second end, and a chamber between said ends, said tubular steel member supporting said hydraulic fluid control valve in said chamber;

said sealing means hydraulically sealing said chamber to enable assembly and testing of said modular control valve assembly at a location remote from said rack housing, said sealing means including a first seal supported by said tubular steel member in a position to block the flow of hydraulic fluid from said chamber toward said first end, and a second seal supported by said tubular steel member in a position to block the flow of hydraulic fluid from said chamber toward said second end; and said fastener means comprising a cap, said cap having threads for engaging threads on one of said housings, and having a surface which has a position abutting a surface on the other of said housings so as to move said housings relative to each other into an assembled relationship upon rotation of said cap.

9. An assembly as defined in claim 8 wherein said valve housing has a longitudinal axis, and said cap has threads for engaging threads on said valve housing to move said valve housing in a direction along said longitudinal axis relative to said rack housing upon rotation of said cap.

10. A hydraulic power rack and pinion steering assembly comprising:
   a longitudinally movable rack having rack teeth;
   a pinion having pinion teeth meshing with said rack teeth, said pinion being rotatable about a first axis;
   a first housing in which said rack is supported for longitudinal movement, said first housing having a surface extending around said first axis to define an opening coaxial with said first axis;
   a hydraulic cylinder for moving said rack longitudinally
   a hydraulic fluid control valve for controlling pressurized hydraulic fluid flow in said hydraulic cylinder;
   a second housing comprising a tubular steel member having a first end, a second end, a chamber between said ends, and a longitudinal axis coaxial with said first axis, said second housing supporting said valve in said chamber;
   means for securing said first and second housings together;
   sealing means for hydraulically sealing said chamber to enable assembly and testing of said valve in said second housing at a location remote from said first housing, said sealing means including a first seal supported by said tubular steel member in a position to block the flow of hydraulic fluid from said chamber toward said first end, and a second seal supported by said tubular steel member in a position to block the flow of hydraulic fluid from said chamber toward said second end; and
   said first housing further having an inner surface defining a passage in which said rack is movable longitudinally, said tubular steel member being receivable in a position extending into said opening in said rack housing with said first and second ends on opposite sides of said rack.

11. A hydraulic power rack and pinion steering assembly comprising:
   a longitudinally movable rack having rack teeth;
   a pinion having pinion teeth meshing with said rack teeth, said pinion being rotatable about a first axis;
   a first housing in which said rack is supported for longitudinal movement, said first housing having a surface extending around said first axis to define an opening coaxial with said first axis;
   a hydraulic cylinder for moving said rack longitudinally;
   a hydraulic fluid control valve for controlling pressurized hydraulic fluid flow in said hydraulic cylinder;
   a second housing comprising a tubular steel member having a first end, a second end, a chamber between said ends, and a longitudinal axis coaxial with said first axis, said second housing supporting said valve in said chamber;
   means for securing said first and second housings together;
   sealing means for hydraulically sealing said chamber to enable assembly and testing of said valve in said second housing at a location remote from said first housing, said sealing means including a first seal supported by said tubular steel member in a position to block the flow of hydraulic fluid from said chamber toward said first end, and a second seal supported by said tubular steel member in a position to block the flow of hydraulic fluid from said chamber toward said second end; and
   a rotatable input shaft extending from said valve through said first end of said tubular steel member, said means for securing said first and second housings together comprising a cap receivable over said second end of said tubular steel member.

12. An assembly as defined in claim 11 wherein said cap has threads for engaging threads on one of said housings, and has a surface which has a position abutting a surface on the other of said housings so as to move said housings relative to each other upon rotation of said cap.

13. An assembly as defined in claim 12 wherein said cap has threads for engaging threads on said second housing to move said second housing along said longitudinal axis.

* * * * *